United States Patent
Pajic

(10) Patent No.: US 8,826,830 B2
(45) Date of Patent: Sep. 9, 2014

(54) TRAY TABLE WITH ROTATABLE INNER TRAY FOR ELECTRONIC DEVICE DOCKING

(76) Inventor: Nick Pajic, Phoenix, AZ (US)

( * ) Notice: Subject to any disclaimer, the term of this patent is extended or adjusted under 35 U.S.C. 154(b) by 221 days.

(21) Appl. No.: 13/314,161

(22) Filed: Dec. 7, 2011

(65) Prior Publication Data

US 2013/0093220 A1    Apr. 18, 2013

Related U.S. Application Data

(60) Provisional application No. 61/546,969, filed on Oct. 13, 2011.

(51) Int. Cl.
  *A47B 23/00*    (2006.01)
(52) U.S. Cl.
  USPC .......................... 108/44; 297/163; 108/50.01
(58) Field of Classification Search
  USPC .......... 108/42, 44, 45, 50.01, 50.02; 297/135, 297/146, 163; 320/108; 361/679.01, 679.02
  See application file for complete search history.

(56) References Cited

U.S. PATENT DOCUMENTS

| | | | |
|---|---|---|---|
| 6,085,666 A * | 7/2000 | Anderson et al. ............... | 108/44 |
| 6,489,745 B1 | 12/2002 | Koreis | |
| 6,601,523 B2 * | 8/2003 | Jensen ........................... | 108/44 |
| 6,732,661 B2 * | 5/2004 | Grasse et al. ............. | 108/50.02 |
| 6,758,518 B2 * | 7/2004 | Ingram et al. .................. | 297/146 |
| 6,792,875 B2 * | 9/2004 | Williamson et al. ............ | 108/44 |
| 7,004,430 B2 * | 2/2006 | Weekly .......................... | 297/146 |
| 7,500,716 B2 | 3/2009 | Guerin et al. | |
| 7,540,243 B2 * | 6/2009 | George et al. .............. | 108/50.01 |
| 7,578,243 B2 * | 8/2009 | Gevaert ........................... | 108/25 |
| 7,611,198 B2 * | 11/2009 | Schweizer ..................... | 297/146 |
| 7,621,593 B2 * | 11/2009 | Dickinson ..................... | 297/163 |
| 7,784,412 B2 * | 8/2010 | Korber et al. ................... | 108/25 |
| 8,250,993 B2 * | 8/2012 | Griepentrog et al. .......... | 108/25 |
| 8,327,774 B1 * | 12/2012 | Rivera ............................ | 108/44 |
| 8,477,482 B2 * | 7/2013 | Lin et al. ................. | 361/679.01 |
| 8,526,170 B2 * | 9/2013 | Nishikawa et al. ...... | 361/679.01 |
| 8,540,309 B2 * | 9/2013 | Berger et al. ................. | 297/163 |
| 8,547,057 B2 * | 10/2013 | Dunworth et al. ............ | 320/108 |
| 8,583,187 B2 * | 11/2013 | Kim et al. ................ | 361/679.01 |
| 2003/0054687 A1 * | 3/2003 | Sanner et al. .................. | 439/535 |
| 2005/0178297 A1 | 8/2005 | Pipkin | |
| 2007/0283855 A1 | 12/2007 | Pozzi | |
| 2011/0174926 A1 * | 7/2011 | Margis et al. ................. | 297/163 |
| 2012/0139303 A1 * | 6/2012 | Westerink et al. ............ | 297/163 |
| 2012/0212012 A1 * | 8/2012 | Berger et al. ................. | 297/163 |
| 2013/0001987 A1 * | 1/2013 | Heredia ........................ | 297/163 |

FOREIGN PATENT DOCUMENTS

JP    02-164635    6/1990

* cited by examiner

*Primary Examiner* — Jose V Chen
(74) *Attorney, Agent, or Firm* — Lightbulb IP, LLC

(57) ABSTRACT

A tray table that provides in-flight entertainment in various forms of media as well as interactivity while being lightweight is disclosed herein. The tray table may provide a removable battery to power an electronic device. This eliminates the need for costly and heavy wiring. The tray table may provide an inner tray that allows the electronic device to be removed for handheld operation. An alert system may be used to prevent theft or unauthorized used by detecting when the electronic device is outside or disconnected from the inner tray.

18 Claims, 13 Drawing Sheets

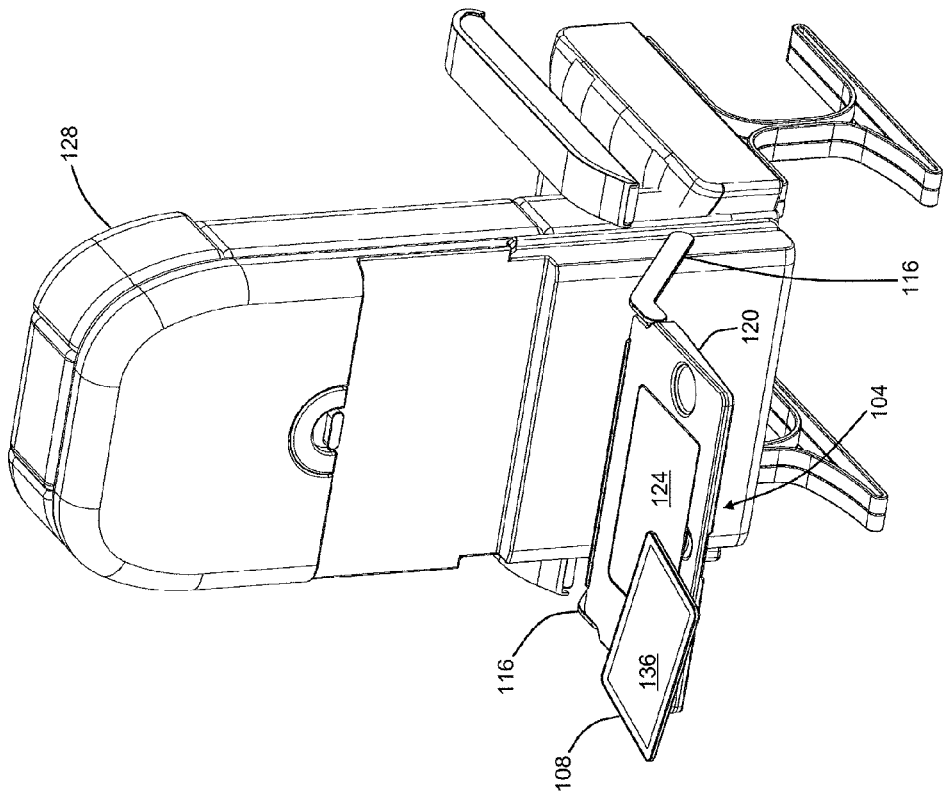
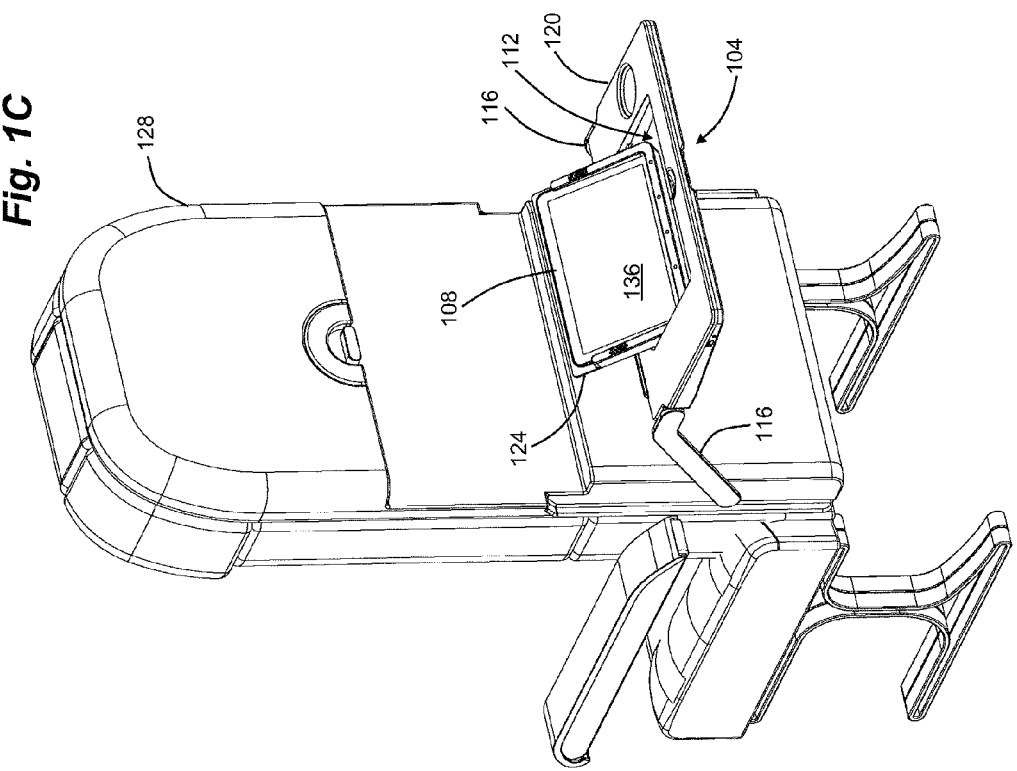

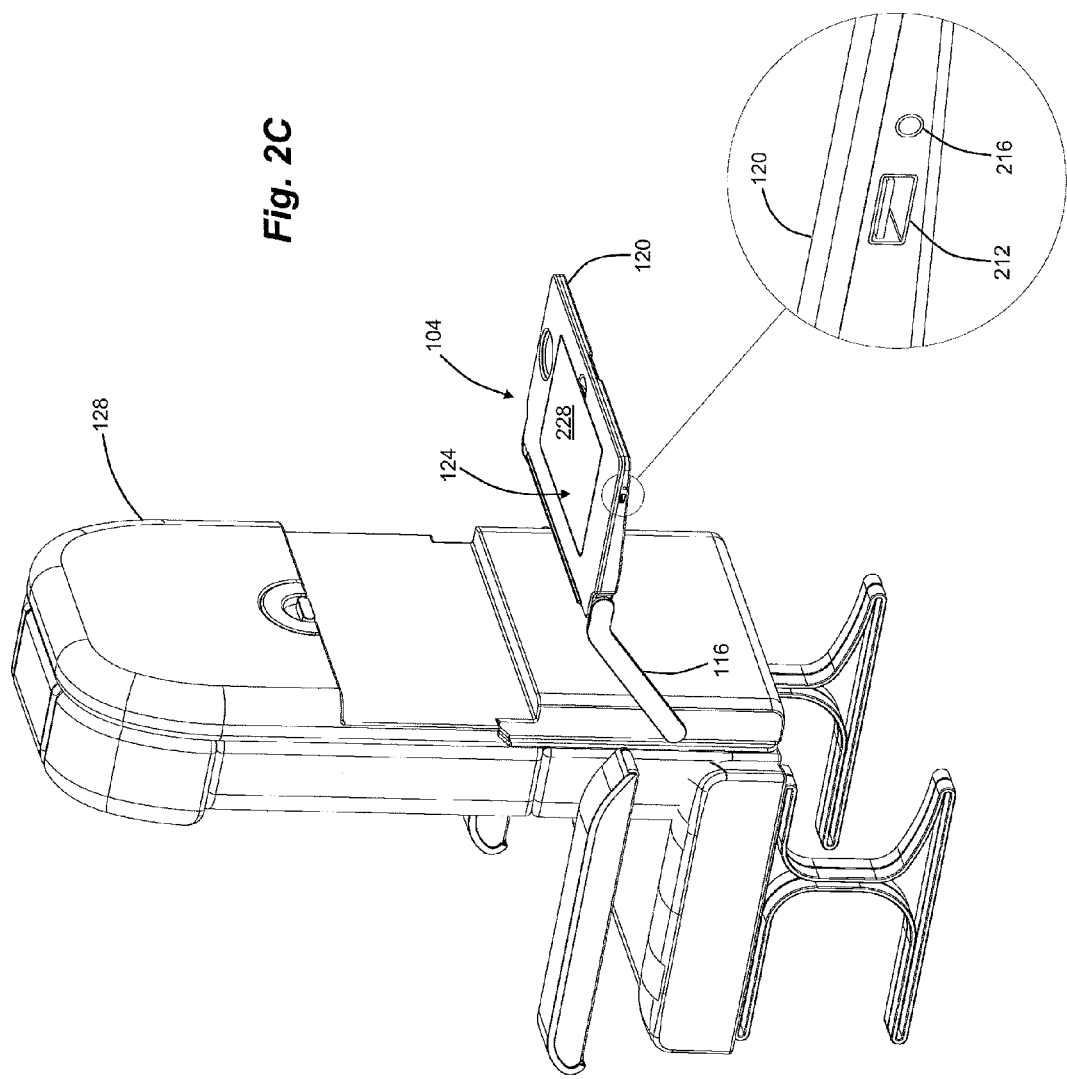

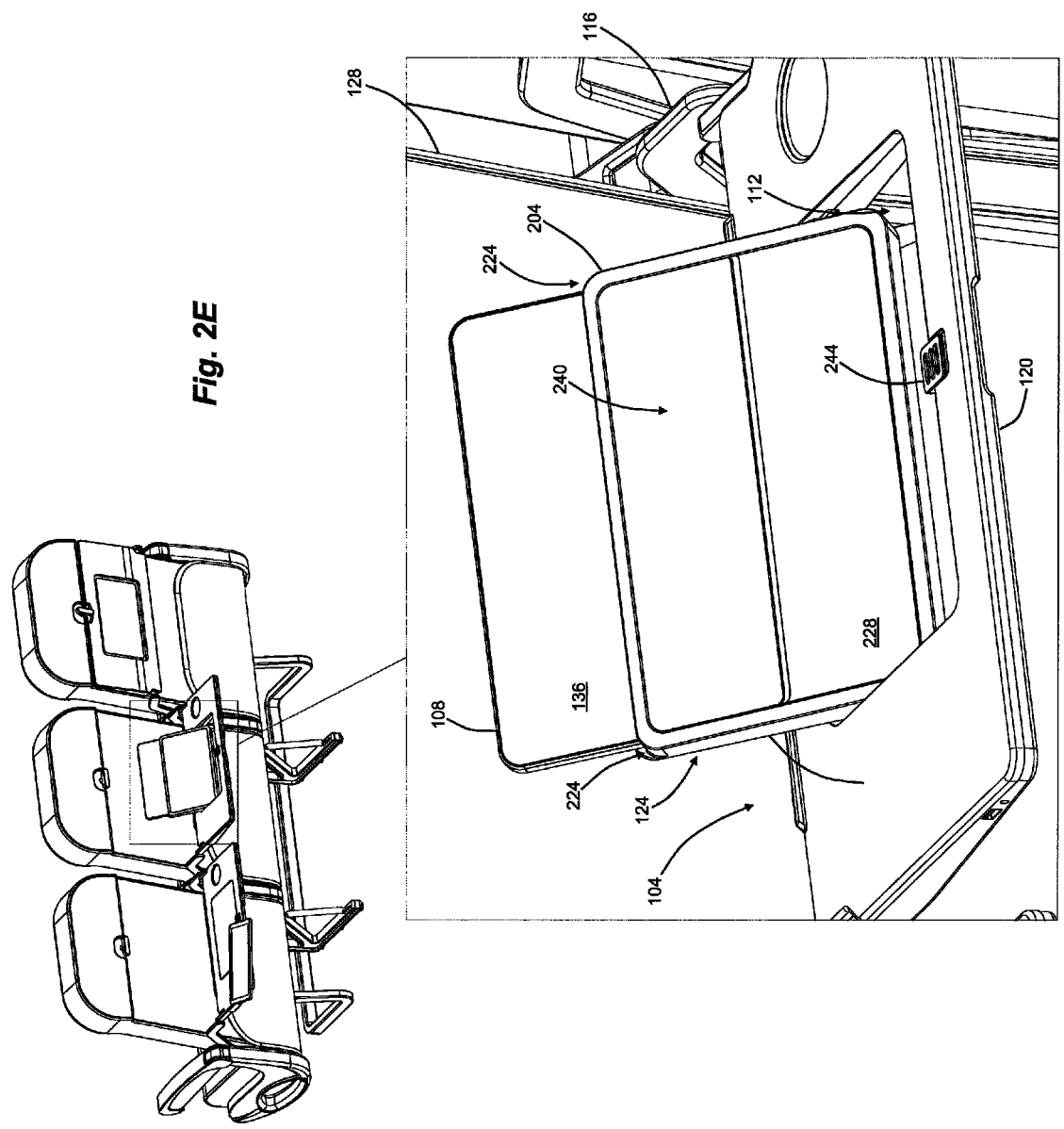

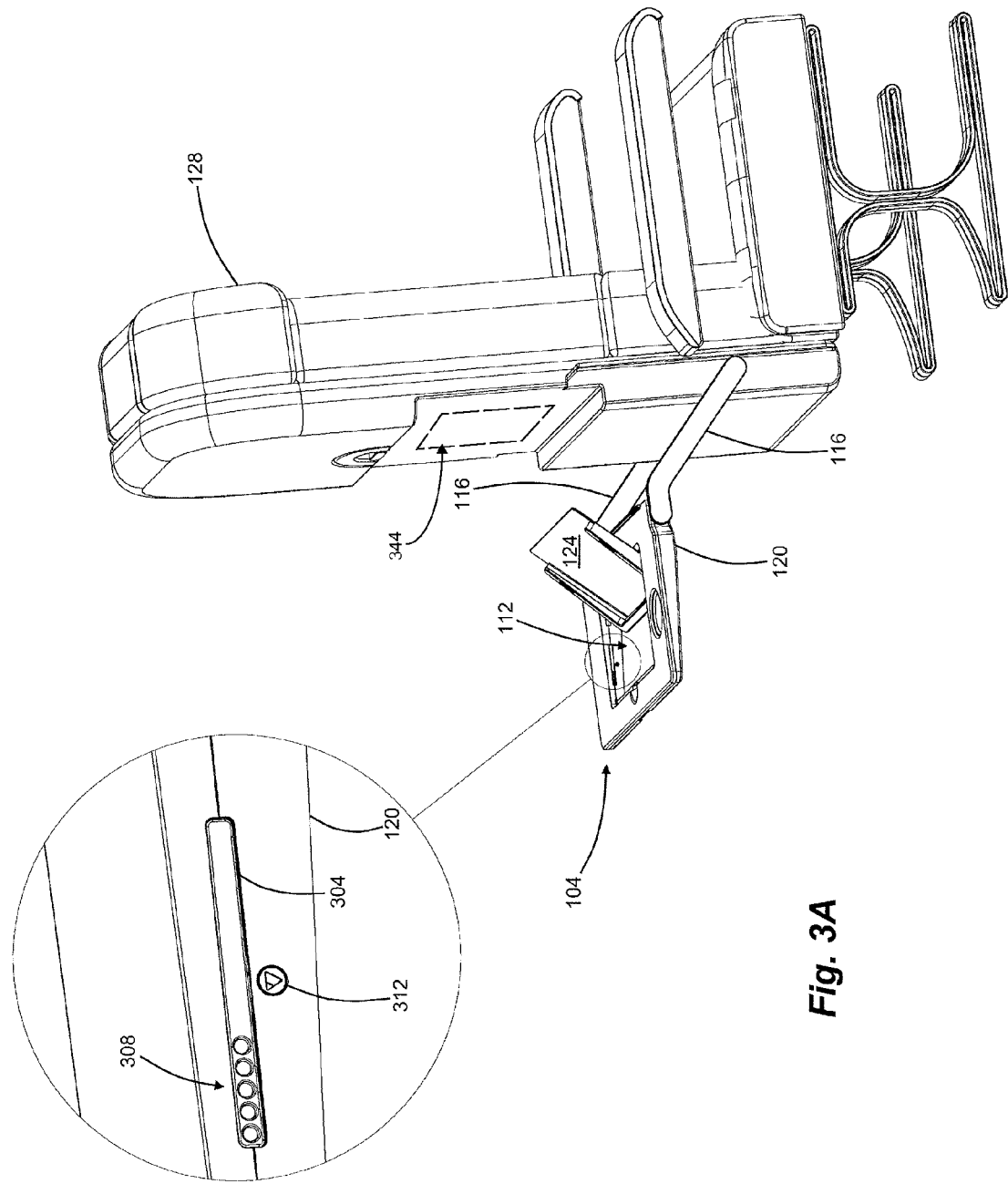

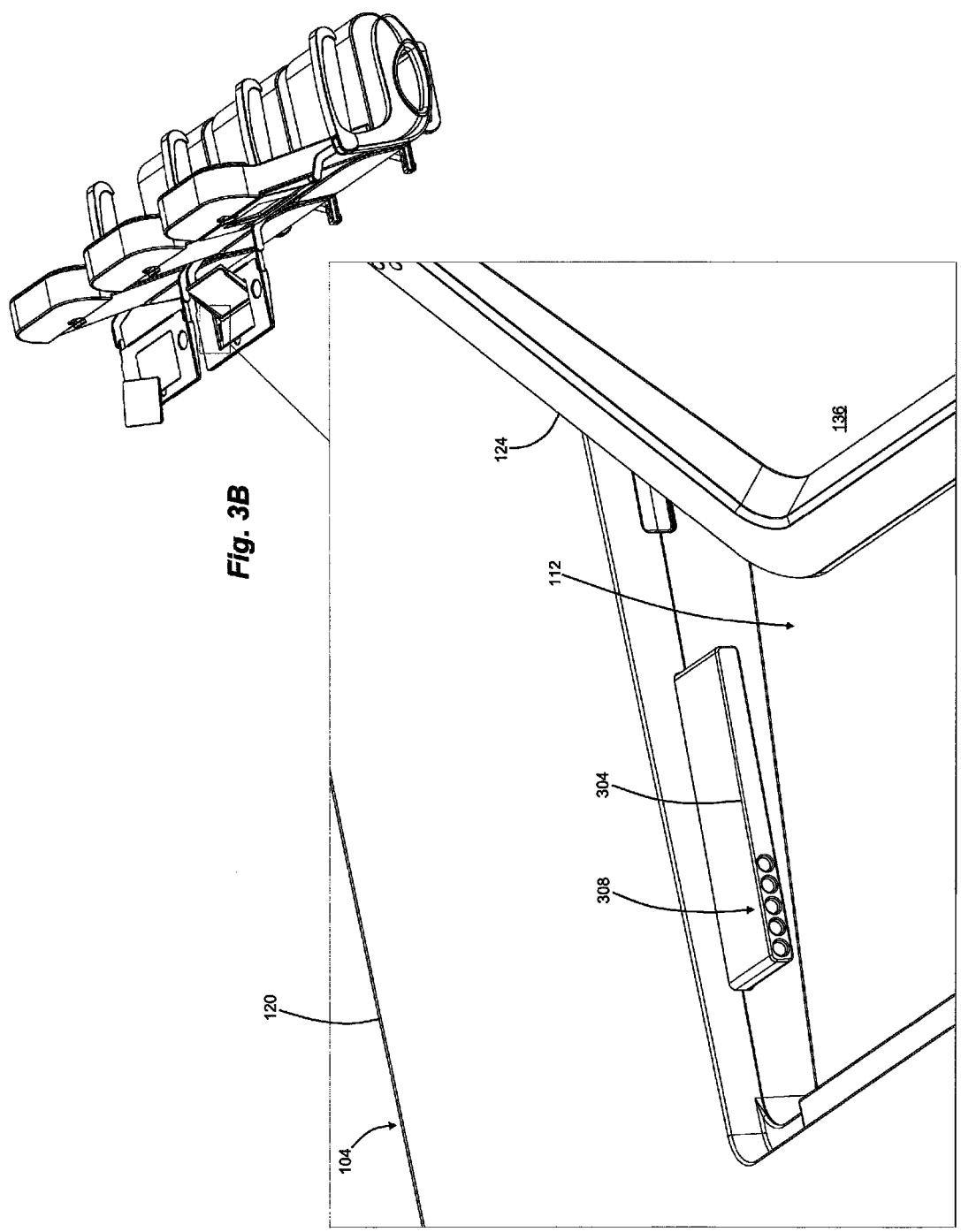

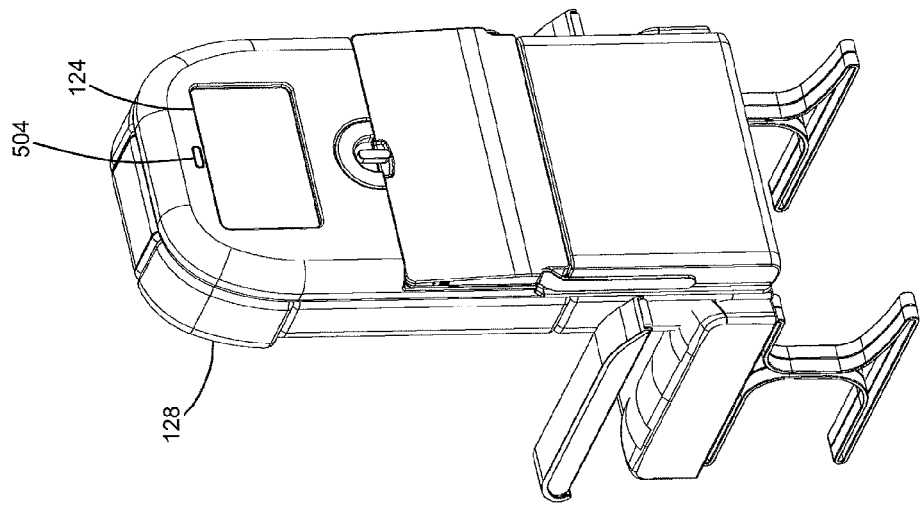
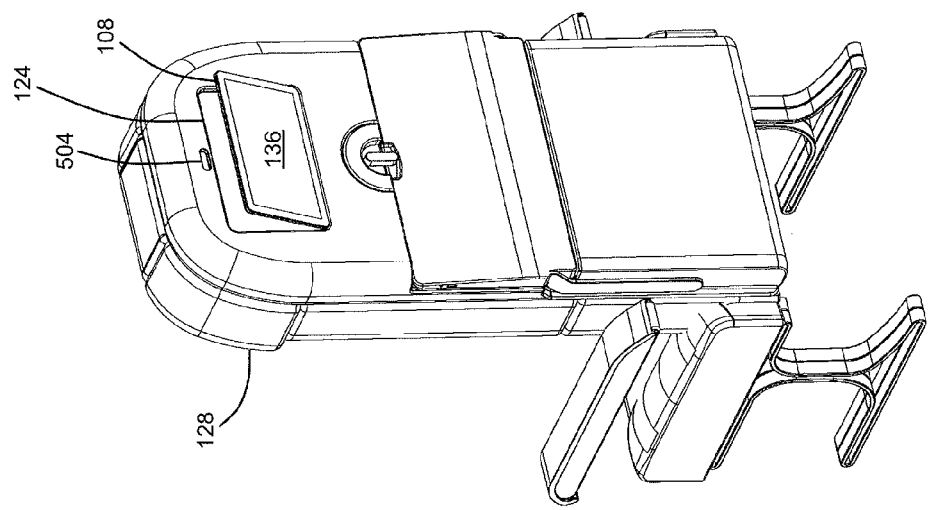
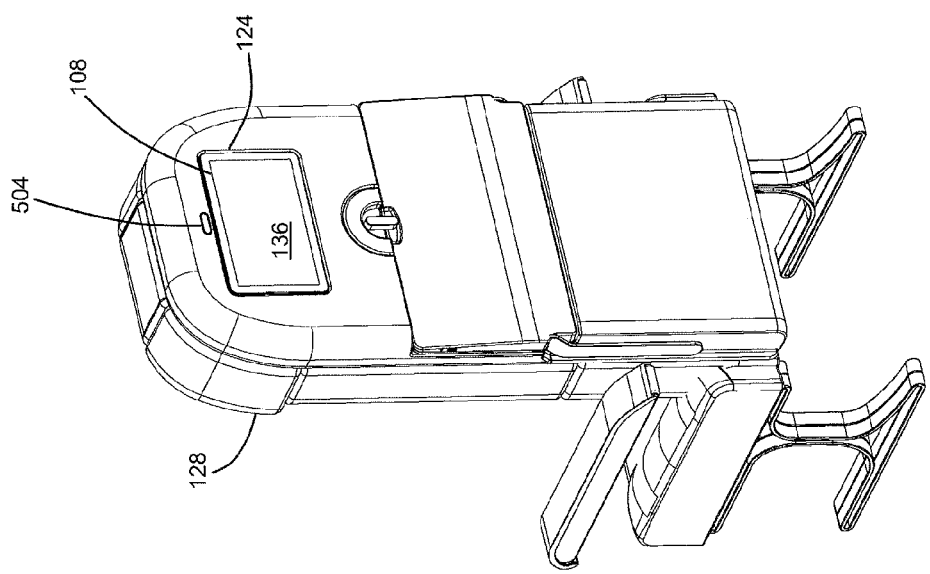

TRAY TABLE WITH ROTATABLE INNER TRAY FOR ELECTRONIC DEVICE DOCKING

CROSS-REFERENCE TO RELATED APPLICATION

This application claims priority to U.S. Provisional Patent Application No. 61/546,969, titled Lightweight Electronic Tray Table, filed Oct. 13, 2011.

BACKGROUND OF THE INVENTION

1. Field of the Invention

The invention relates to seatback tray tables and in particular to a tray table with a rotatable inner tray for electronic devices.

2. Related Art

Airplane tray tables have been largely unchanged for decades. In general, such tray tables move between a stowed upright position and a service position where a tray table is generally horizontal so that items may be supported by the tray table. In the service position, the tray table may be used to support food, drink, and other items for a passenger.

Attempts have been made to update traditional tray tables. For example, U.S. Patent Publication No. 2011/0126739 discloses a portable collapsible tray table apparatus configured to provide an elevated platform upon which a user's electronic device may be supported. For instance, the tray table apparatus may support the user's laptop at an elevated position. The elevated platform may also include a removable panel that can be removed to reveal an electronic device holder for holding a user's electronic device.

As another example, U.S. Pat. No. 7,500,716 discloses a multi-function tray table having a slidable portion and an internal stationary portion. The slidable portion extends towards a passenger during use while the stationary portion does not. The stationary portion and the sliding portion are required parts of an elaborate mechanism configured to ensure that an entertainment device of the tray table is viewable when the tray table is stowed.

From the discussion that follows, it will become apparent that the present invention addresses the deficiencies associated with the prior art while providing numerous additional advantages and benefits not contemplated or possible with prior art constructions.

SUMMARY OF THE INVENTION

A tray table that provides in-flight entertainment (IFE) while being lightweight and easy to maintain is provided herein. The tray table provides weight savings compared to traditional tray tables or in-flight entertainment systems due to its structure and its internal power system. In addition, the tray table may be configured as a self contained unit to speed installation and reduce maintenance costs. For instance, as will be detailed below, the internal power system of the tray table eliminates the cost and weight of wiring to individual passenger seats. In instances where airline carriers wish to replace existing IFE seat mounted electronic devices and where the power is already available at the seat, the internal power system can be augmented by wiring the tray table to a pre-existing power source.

The tray table is also advantageous in that it is capable of housing IFE portable devices for commercial and other aircraft applications, and provides backup battery power or aircraft power to keep such electronic devices charged and operational. The electronic devices may communicate with one or more onboard servers wirelessly or via one or more wired communication links.

As will also be described herein, the tray table also provides a number of media functions, such as distributing media, advertisements and the like to passengers. In addition, the tray table may be interactive to allow passengers to view media, order goods or services, play games, communicate with others, and otherwise interact with the tray table.

The tray table may have various embodiments. For example, in one embodiment a tray table for a passenger seat may be provided. In such an embodiment, the tray table may comprise a body having a compartment for a battery, and an inner tray configured to receive and hold a portable electronic device with a display screen. A port may be attached to the inner tray to connect to the portable electronic device. The battery may be in electrical communication with the portable electronic device via the port. An opening in the body may be configured to accept the inner tray, which may be rotatably mounted in the opening. It is contemplated that the inner tray may include a transparent cover to protect the display screen.

One or more mounts may attach the body to a back portion of the passenger seat. The body may be rotatably mounted to the back portion of the passenger seat, such as to allow the tray table to be stowed or deployed.

A sensor configured to detect the presence or absence of the portable electronic device in the inner tray may be included as well. The tray table may then emit an alert if the sensor detects that the portable electronic device is absent from the inner tray. It is noted that this alert may be emitted only at particular times. For example, during takeoff and landing of a plane, an alert may be generated if a passenger has his or her portable electronic device out of its inner tray. The alert may be transmitted to a flight crew or other personnel or to the passenger so that someone is aware that the portable electronic device needs to be returned to the inner tray.

It is noted that the battery of the tray table may be rechargeable. In addition, the battery may be removable from the body. In this manner, a discharged battery can be easily replaced with a charged battery. Though the portable electronic device may, in some circumstances, have its own internal power source (e.g., battery), the battery of the tray table may be used to power or recharge the portable electronic device, such as on long journeys or flights.

In another exemplary embodiment, a tray table for a passenger seat might comprise a body having an opening therein, and one or more mounts configured to rotatably attach the body to a back portion of the passenger seat. The body may be moved between a stowed position and a service position relative to the passenger seat.

An inner tray may be configured to hold a portable electronic device. The inner tray may be rotatably mounted in the opening, such that, the inner tray may be rotated to between an open position and a closed position when the body is in the service position. A back panel of the inner tray may be coplanar with a top surface of the body when the inner tray is in the closed position. In addition, a display screen of the portable electronic device may be visible through one end of the opening in the body when the inner tray is in the closed position.

The tray table for a passenger seat may also have a battery compartment in its body, and an electrical connection between the battery compartment and the inner tray to provide power to the portable electronic device. As discussed, the battery compartment may be configured to releasably hold one or more batteries. An indicator supported by the body may be configured to indicate a charge level of one or more batteries in the battery compartment.

A sensor configured to detect when the portable electronic device is absent from the inner tray may be provided as well. In such embodiments, a communication device may be included to transmit a notification when the sensor detects the portable electronic device is absent from the inner tray.

Various methods relating to the tray table are disclosed herein as well. In one embodiment for example, a method for providing in-flight entertainment with a tray table is provided. Such a method may comprise securing a tray table comprising an opening having a rotatable inner tray secured therein to a passenger seat with one or more mounts, receiving a portable electronic device with the inner tray, and securing the portable electronic device to the tray table with the inner tray.

The portable electronic device may be provided with a display screen for providing the in-flight entertainment, and may be rotatable when held by the inner tray. Power may be provided to the portable electronic device through one or more batteries in a compartment of the tray table when the portable electronic device is held by the inner tray. A media server configured to provide in-flight entertainment material via electronic communication with the portable electronic device may be provided as well. Such server may be installed on the plane or other vehicle carrying the tray table(s).

It is noted that the batteries may be ejected from the compartment with a release mechanism of the compartment to replace the batteries. A power level indicator configured to indicate the power level of the batteries in the compartment may be provided as well. This allows the power lever to be readily ascertained so that the batteries may be replaced if necessary.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 1C is a perspective view of an exemplary tray table in an open service position;

FIG. 1D is a perspective view of an exemplary tray table in a service position;

FIG. 2C is a perspective view of an exemplary tray table and external connection ports;

FIG. 2E is a perspective view of an exemplary tray table and inner tray;

FIG. 3A is a perspective view of a battery of an exemplary tray table;

FIG. 3B is a perspective view of a battery of an exemplary tray table in an extending position;

FIG. 5A is a perspective view of an exemplary headrest mounted electronic display;

FIG. 5B is a perspective view of an exemplary headrest mounted electronic display in a pivoted position; and FIG. 5C is a perspective view of an exemplary headrest mounted inner tray.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The tray table herein enhances the utility of a tray table by providing IFE capabilities, while lowering weight and maintenance costs which will reduce fuel costs and carbon emissions. Though described herein with reference in an airplane environment, it is noted that the tray table may be used in various vehicles, such as busses, cars, limousines, trains, and other vehicles. In addition, the tray table may be used in other settings such as waiting rooms, internet kiosks, and the like.

As will be described further below, the tray table also saves in fuel costs because of the weight savings achieved by its open and lightweight structure. In addition, the electronic components of the tray table are easily serviceable and have the significant advantage in that they do not require any additional wiring. This is highly advantageous in that it avoids the weight of such wiring, the cost of the installation of such wiring, downtime to install the wiring, as well as certification of an aircraft after such wiring has been installed.

The tray table includes electronic elements for IFE. This is an advantage in that it eliminates the need to have inflight magazines, brochures, safety manuals and the like on board. This saves weight and thus saves fuel. In addition, maintenance crews no longer need to spend time replacing old or worn inflight materials ordinarily stored in seat pockets or overhead bins (or elsewhere on an aircraft). On top of this, the printing and distribution costs for such materials is eliminated.

The electronic elements of the tray table also create a more enjoyable passenger experience. As will be described further below, the tray table may be interactive and may be used to present various media, including music, games, and videos, and other digital content to keep passengers entertained. In addition, passengers may use the tray table to communicate with flight crews or others via text, audio, video, and the like. Typically, this interactivity, communication, and media capability will be provided via an electronic device with one or more display screens that may be provided with and/or coupled or docked to the tray table.

Figure 1A:
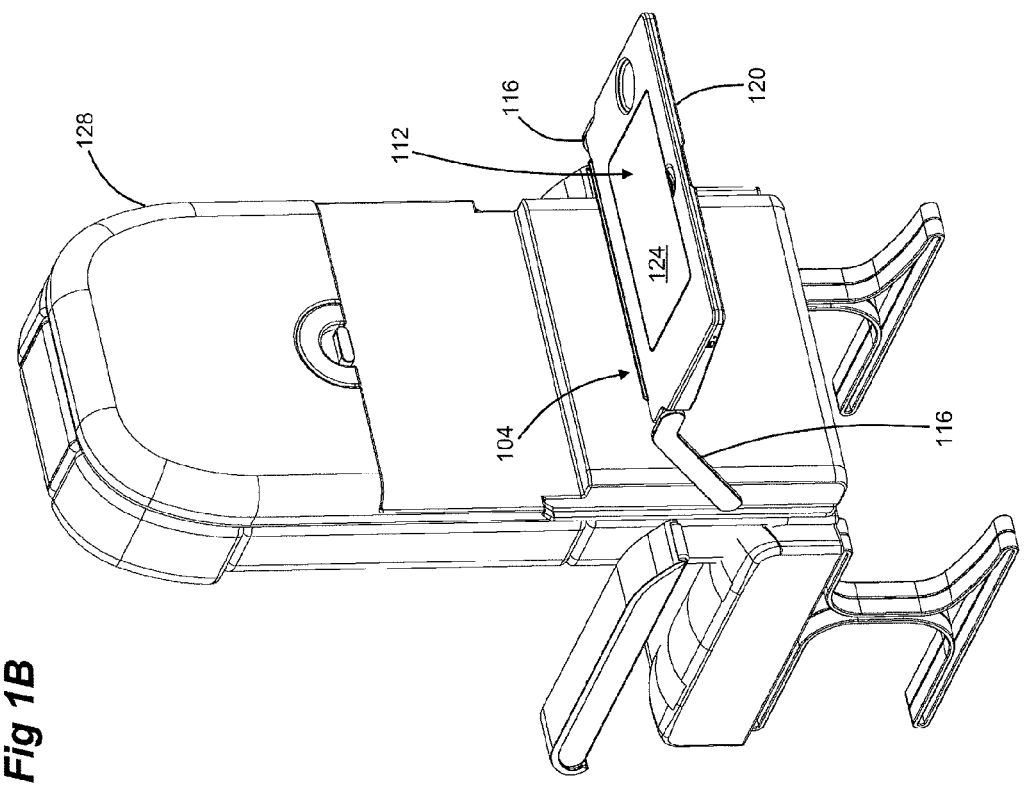
FIG. 1A is a perspective view of an exemplary tray table in a stowed position.
Figure 1B:
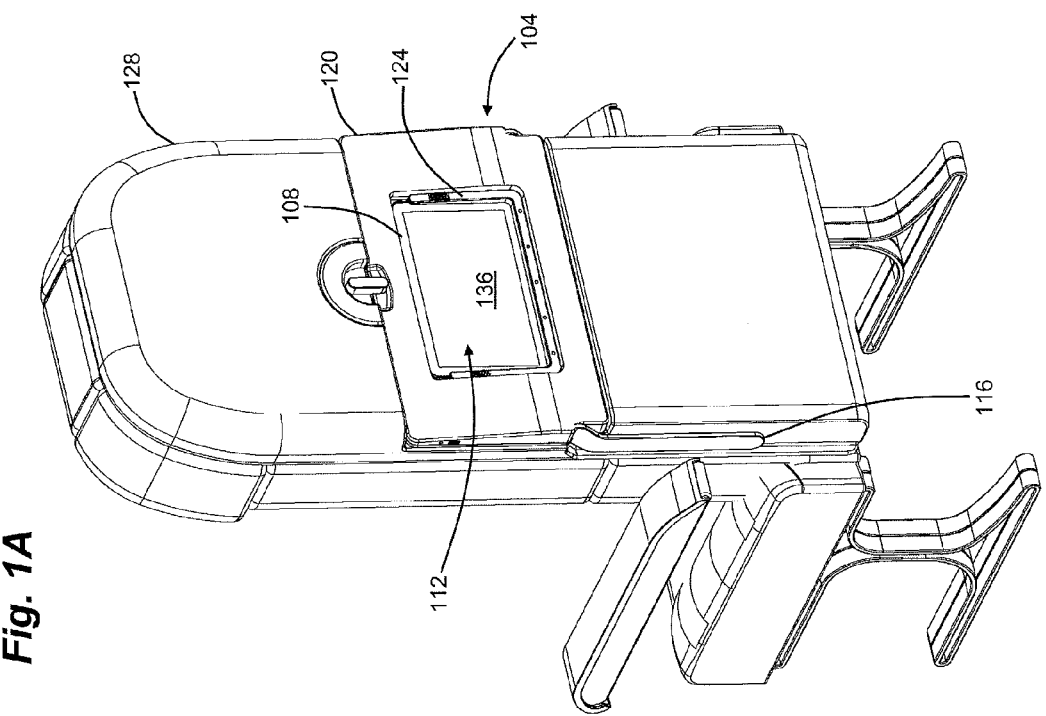
FIG. 1B is a perspective view of an exemplary tray table in a service position with inter-tray in a closed position.

The tray table will now be described with regard to FIGS. 1A-1E. FIGS. 1A-1E provide various views of the tray table 104. As can be seen, the environment of use shown is an aircraft passenger seat 128, though the tray table 104 may be used in a variety of vehicles and seats. The tray table 104 may have a stowed position, such as shown in FIG. 1A, and a service position, such as shown in FIGS. 1B-1C. As can be seen, in the service position, the tray table 104 may be deployed for use as a horizontal support surface (for food, drink, etc. . . . ), while allowing its electronic device 108 to be used if desired. It is noted that the electronic device 108 may also be used in the stowed position. For example, a user may view advertisements and interact with the electronic device 108 in the stowed position (as well as in the service position) via a display 136 of the electronic device. As will be described further below, the electronic device 108 may be held in or dock with an inner tray 124 of the tray table 104, which may power or charge an electronic device 108 through an external port via a battery charger cable.

The tray table 104 may be movably attached to a passenger seat 128. In the embodiments shown for example, the tray table 104 is attached to the passenger seat 128 with pivoting arms 116 that allow the tray table to be moved between the stowed and service positions. The tray table 104 may be movably attached to a passenger seat 128 (or other seat or structure) in this and other ways, such as with hinges, pivots, and the like.

As can be seen, in the stowed position (shown by FIG. 1A), the electronic device 108 is positioned such that its display 136 is visible to a passenger through an opening 112 of the tray table 104. In this manner, the passenger can view various media even when the tray table 104 is stowed. For example, one or more advertisements may be presented to the passenger in the stowed position. These advertisements may be presented during boarding, taxiing, takeoff, landing, and cruising altitude for example. Other media or IFE services/materials may be provided as well, such as books, magazines, music, and video. For example, after the aircraft has reached a particular altitude (such as a cruising altitude), this media may be accessible to the passenger. Advertising may still be provided if desired.

In the service position (shown by FIG. 1B), the tray table 104 may be used in a manner similar to a traditional tray table. As can be seen, the back of the inner tray 124 may provide a planar surface that spans the opening 112 in the tray table 104. In this manner, a continuous surface can be provided to support food, drink, or other items. As will be described further below, the inner tray may rotate to conceal and reveal the electronic device 108 it holds.

The opening 112 in the tray table 104 is beneficial in that it results in a weight savings since there is no material at that portion of the tray table 104. In addition, the inner tray 124 does not utilize complex and heavy components to accomplish its rotation or movement, as will be described further below. This also helps ensure that the tray table 104 has a low overall weight despite having a wide range of media and interactive capabilities.

Referring to FIG. 1C, operation of the inner tray 124 can be seen. As shown for instance, the inner tray 124 may rotate within the opening 112 of the tray table 104. In FIG. 1C for instance, the inner tray 124 has been tilted back (towards the passenger seat 128) to reveal the electronic device 108 held by the inner tray. This is an open position of the inner tray 124. As can be seen, the display 136 of the electronic device 108 is held at a comfortable viewing position for the passenger in the open position.

The inner tray 124 may be rotatably mounted to the body 120 of the tray table 104. In this manner, the inner tray 124 can be moved from a closed position (such as shown in FIG. 1B) to an open position and vice versa. Is some embodiments, the pivot or rotating mount may allow the inner tray 124 to rotate a full 360 degrees. For example positioning the rotating mount at a midpoint of the inner tray 124 would permit the inner tray to rotate 360 degrees within the opening.

In other embodiments, a reduced angle of rotation may be provided. One or more stops may be provided to fix the inner tray 124 at an open or closed position or at various other angles. For example, the inner tray 124 may rotate from a closed position (at 0 degrees), to an open position less than 180 degrees. In another example embodiment, the inner tray may rotate to a maximum of 130 or 140 degrees. The stops may physically hold or block rotation of the inner tray at the maximum angle or at various angles in between. This allows a passenger to position the inner tray 124 (and the electronic device 108 held therein) at a desired viewing angle. The stops may be disengaged to move the inner tray 124 to other positions. It is noted that the rotating mount holding the inner tray 124 may utilize a friction hold to hold the inner tray 124 at whatever angle the passenger moves the inner tray to.

In some embodiments, the rotation of the inner tray 124 may be stopped by physical contact with a portion of the tray table 104. For instance, as shown in FIG. 1C, the back of the inner tray 124 is in contact with a back section of the tray table 104 thereby stopping the inner tray's backward rotation and holding the inner tray (and electronic device 108) in that open position.

Referring to FIG. 1D, it can be seen that the inner tray 124 may allow the electronic device 108 to be removed so that a passenger may hold the electronic device in his or her hands during use. This is advantageous in that it causes the electronic device 108 to not be a permanent fixture of the aircraft, while increasing the convenience to passengers. It is noted that the tray table 104 may be configured to inductively or otherwise wirelessly charge the electronic device 108 in some embodiments. Therefore, the electronic device 108 may be charged or powered by placing it on or near the tray table 104, or in the inner tray 124.

Figure 1E:
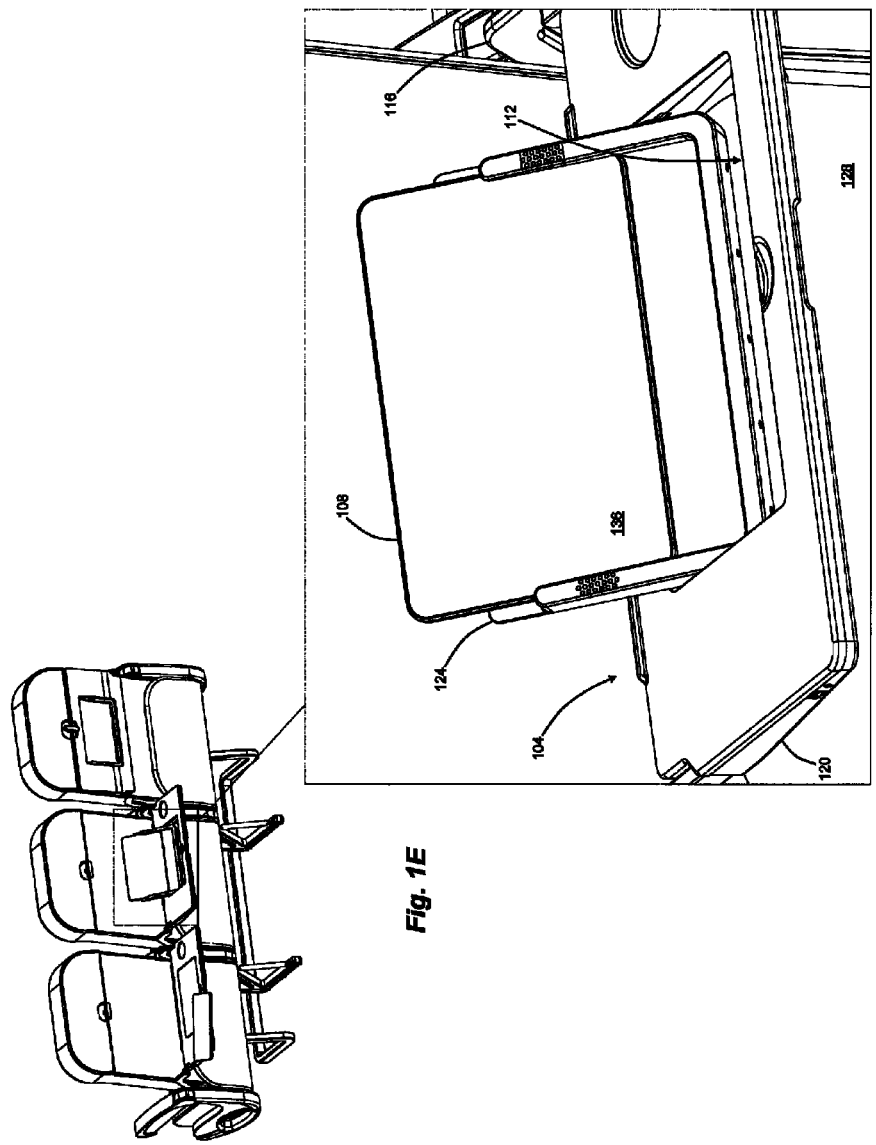
FIG. 1E is a perspective view showing removal of an electronic device from an exemplary tray table.

The electronic device 108 may be installed or removed in various ways as will be described below. For instance, FIG. 1E illustrates that the electronic device 108 may be installed or removed by sliding it into or out of the inner tray 124.

It is contemplated that the electronic device 108 and/or tray table 104 may have an alerting mechanism (such as one or more speakers, lights, or the like) to indicate unauthorized use of the electronic device. For example, one or more lights, alarms, sirens or other audiovisual alerts may be emitted during unauthorized use. To illustrate, an alert may be emitted when the electronic device 108 is not in the inner tray 124 during takeoff or landing or at other times when the flight crew restricts use of the electronic device outside the inner tray. This also prevents theft in that an alert will be emitted if the electronic device 108 is not within the inner tray 124 during landing. It is noted that the flight crew may be alerted as well, such as via a pager, tablet, or other electronic device possessed by members of the flight crew.

The flight crew may activate or deactivate the alarm mechanism, or the alarm mechanism may automatically activate or deactivate such as when the aircraft is at or within a particular altitude or range of altitudes. A tray table 104 may have its own altimeter for these purposes or may receive altitude from an aircraft altimeter either through a wired or wireless connection. As an additional theft or unauthorized use preventer, the electronic device 108 may also or alternatively be labeled with a warning label cited consequences and/or rules and regulations governing the tampering with or theft of aircraft fixtures.

The inner tray 124 may have one or more switches, contacts, sensors, or the like to determine whether the electronic device 108 is within the inner tray. In addition, the tray table 104 may have a lock in some embodiments to prevent it from being moved from the stowed position to the service position. This feature may also be used to prevent theft of the electronic device 108.

Figure 2A:
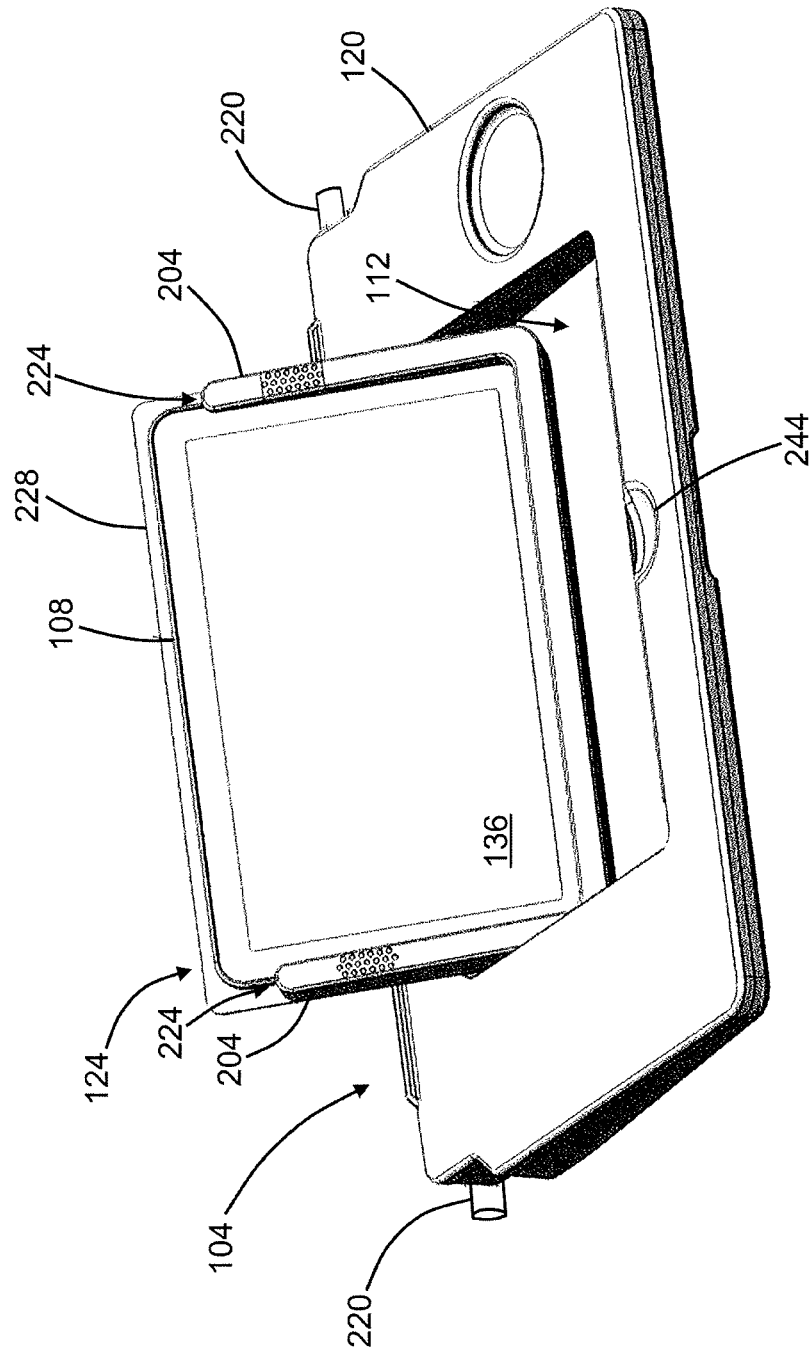
FIG. 2A is a perspective view of an exemplary tray table and inner tray.

Further details regarding the tray table 104 will now be described with regard to FIGS. 2A-2C. As can be seen, the tray table 104 may comprise a body 120 having an opening 112 where the inner tray 124 is rotatably mounted. The opening 112 may have one or more mounting structures to hold the inner tray 124. For example, one or more mounts may be at the side walls or sides of the opening. The mounts may engage the inner tray 124 to rotatably secure the inner tray. The mounts may be various structures. For example, the mounts may be pins, axels, pivots, hinges or the like. In one or more embodiments, a mount may be located at both sides of the opening 112 to provide the rotation of the inner tray 124 as shown in the figures.

The opening 112 may be at various locations of the body 120. For instance, as shown in FIG. 2A the opening 112 is centrally located. This centers the inner tray 124 and electronic device. It is contemplated that the opening 112 could be at the sides or closer to the sides of the body 120 in some embodiments.

One or more mounts 220 may be attached to the body 120. This allows the body 120 and thus the entire tray table 104 to be attached to a passenger seat 128. For example, referring to FIG. 1B, it can be seen that the mounts 220 may connect one or more supports 116 to the tray table 104 to secure the tray table. The mounts 220 may be configured to allow the body 120 to rotate. Similar mounts or pivots, axels, pins or the like may be used to rotatably mount the inner tray 124 to the tray table 104.

As stated, the inner tray 124 is generally configured to support or hold the electronic device 108. This may be accomplished in various ways. For instance, as shown in FIG. 2A, the inner tray 124 may comprise one or more channels 204 that accept a portion of the electronic device 108. In FIG. 2A, it can be seen that the channels 204 accept an outer peripheral portion of the electronic device 108 to hold the electronic device. The channels 204 may have a "U" shaped cross section to accept a peripheral portion of the electronic device 108, such as shown. Channels 204 may be located at the sides as well as the bottom of the inner tray 124 (as shown in FIG. 2A).

In some embodiments, channels 204 may only be at the sides of the inner tray 124. The channels 204 may extend around the electronic device 108 to various extents. For example, as seen in FIG. 2E, the channels 204 extend a further distance along the length of the left and right sides of the electronic device 108.

The channels 204 may be configured to allow the electronic device 108 to be removable. For example, the channels 204 have an open portion 224 where the electronic device 108 may be inserted into (as well as removed from) the channels 204. In this manner the electronic device 108 may be removed by pulling it out of the channels 204 and may be inserted by sliding or moving the electronic device into the channels at the open portion 224 of the channels.

It is noted that the channels 204 or a portion thereof may be curved or angled along their length such as to better secure the electronic device 108 therein. Alternatively or in addition, the channels 204 may provide a snug fit relative to the peripheral portion of the electronic device 108 that is inserted into the channels. In this manner the electronic device 108 can still be removed but is less likely to accidentally come out or fall out of the inner tray 124. In addition, since fasteners are not required (but may be used if desired), the inner tray 124 has a reduced weight while removably securing the electronic device 108.

In some embodiments, channels 204 may have one or more openings 236 (e.g., weep holes) therein. In the event a liquid is spilled, the openings will allow such liquid to escape the channels 204 to prevent the channels from "flooding". The channels 204 can then dry and/or be cleaned. Exemplary openings 236 are illustrated in FIGS. 2B and 2D.

It is noted that the electronic device 108 may be removably secured to the inner tray 124 in various ways. For example, the electronic device 108 and inner tray 124 may comprise coupling or mating fasteners which releasably hold the electronic device to the inner tray. Alternatively or in addition, the electronic device 108 may be removably secured to the inner tray 124 by a friction fit or magnets.

The inner tray 124 may also have a back panel 228. As described above with regard to FIG. 1B, the back panel 228 or section of the inner tray 124 may form a planar surface that spans the opening 112 of the tray table 104 to provide a continuous support service when the tray table is in the service position (and the inner tray is in a closed position).

Figure 2B:
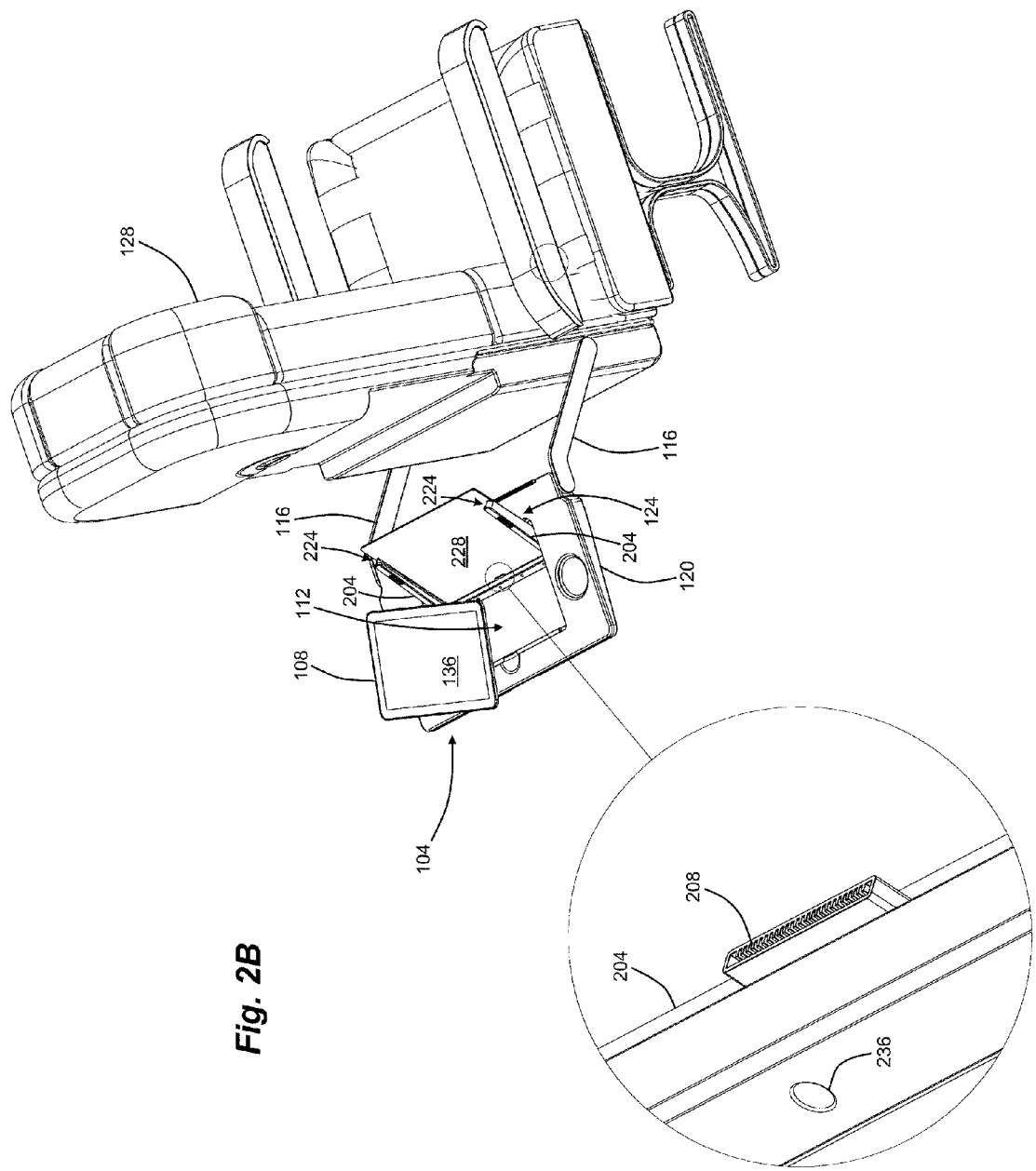
FIG. 2B is a perspective view of an exemplary tray table and inner tray.
Figure 2D:
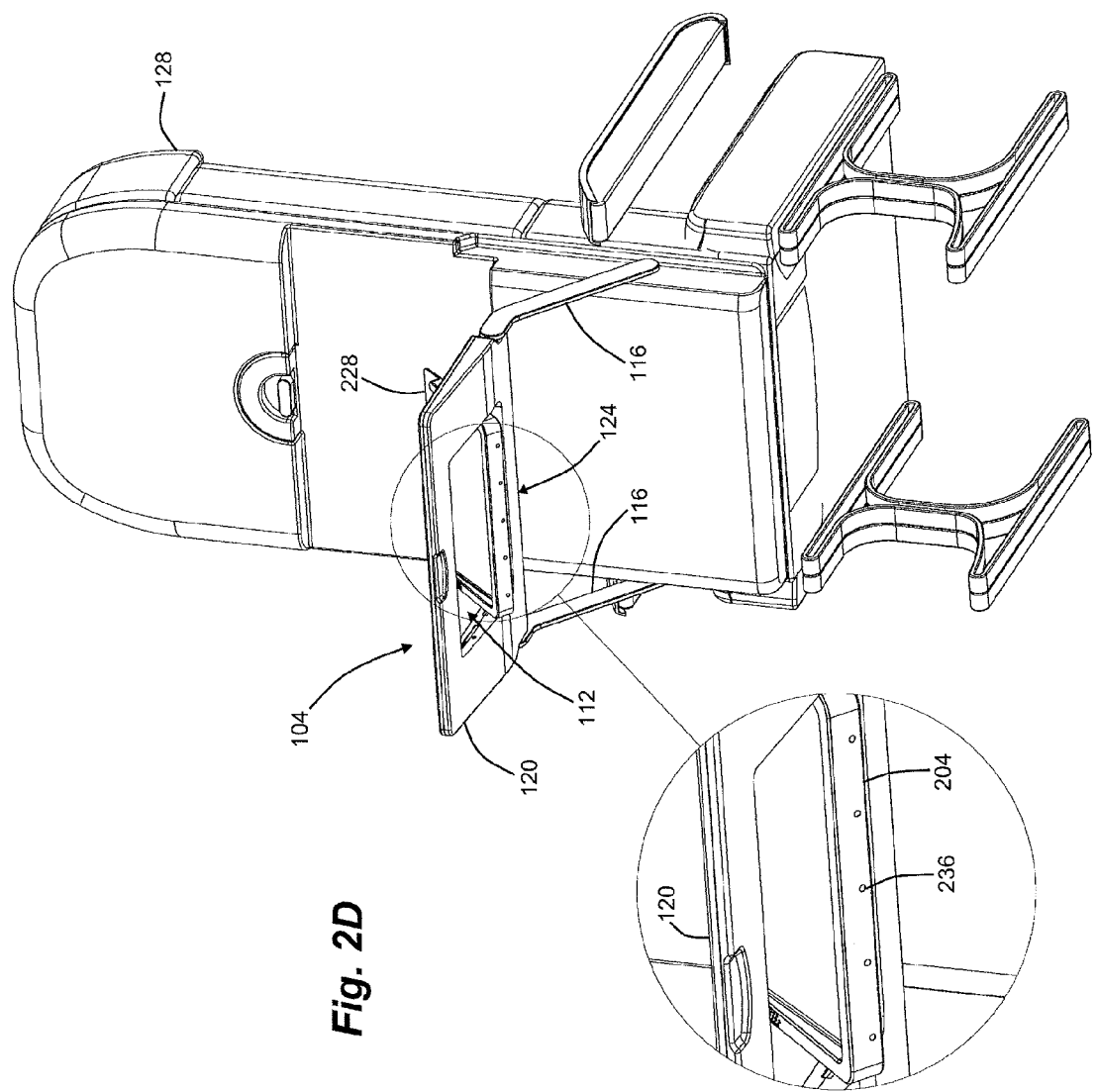
FIG. 2D is a bottom perspective view of an exemplary tray table showing weep holes.

FIG. 2B illustrates top angled view of the tray table 104, with the electronic device 108 removed. The concave shape (e.g., "U" shaped cross section) of the channels 204 that accepts the electronic device 108 can be seen in this view.

Also it can be seen from FIG. 2B that the inner tray 124 may have one or more interfaces or ports 208 that provides an electrical or other connection to the electronic device 108. As will be described further below, this is advantageous in that data and/or power may be transferred to/from the electronic device 108 via this port 208. Thus the flight crew or airline need not worry about charging the electronic device 108 directly, since the electronic device can be charged by the tray table 104 itself. It is noted that a connection with the port 208 may be used to determine if the electronic device 108 is within the inner tray 124 for theft or unauthorized use detection as described above.

The port 208 may be positioned such that it automatically connects with the electronic device 108 when the electronic device is stored in the inner tray 124. As shown for example, the port 208 is located at a bottom portion of the inner tray 124 where it can automatically connect to a corresponding connector of the electronic device when the electronic device is inserted.

Referring to FIG. 2C, the tray table 104 may also provide one or more other ports or connectors 212,216. For example, audio, USB, power, data, and other connections could be provided via these connectors 212,216. Typically, these connectors 212,216 will be configured to allow passenger devices, such as laptops, smart phones, tables, headphones, and the like to be connected. For instance, as shown in FIG. 2C, an audio jack 216 and USB port 212 are provided at the side of the tray table's body 120 where they are accessible to a passenger even when the inner tray 124 is closed. It is noted that audio media and data could be accessed/shared from the electronic device 108 via these connectors 212,216 when the inner tray 124 is both closed and opened.

It is noted that the inner tray 124 may be held in a closed position by a latch 244 in some embodiments. The latch 244 may utilize a mechanical structure to hold the inner tray 124 closed. When actuated or otherwise manipulated the latch 244 may release the inner tray 124 allowing it to rotate to an open position. In some embodiments, the latch 244 may utilize a friction fit or magnets which hold the inner tray 124 closed which can be overcome by the user to rotate the inner tray to an open position.

The inner tray 124 may also protect the electronic device 108 in some embodiments. For instance, as shown in FIG. 2E (which shows the electronic device 108 partially removed from the inner tray 124), the inner tray 124 may provide a cover 240 to enclose and/or protect the electronic device 108. The cover 240 may be transparent to allow the screen 136 of the electronic display 108 to remain visible. The cover 240 may be a rugged and/or resilient material to resist shattering or breaking Should the screen 136 shatter or break, the cover 240 will contain the screen within the inner tray 124. In addition, the cover 240 may prevent damage to the screen 136 caused by physical impacts. It is contemplated that the electronic device 108 may be positioned adjacent the cover 240 such that touch screen input is operational through the cover.

In addition to the weight savings described above, the tray table 104 saves a great deal of additional weight by eliminating the need for wiring. In traditional IFE systems, an aircraft must either be built with wiring to support (e.g., power) the IFE system at each seat or must be retrofitted with such wiring. This wiring adds significant weight to the aircraft and requires inspection and certification. In the case of a retrofit, adding wiring is an extremely complex operation and requires an aircraft to be removed from service for a substantial amount of time.

Figure 3C:
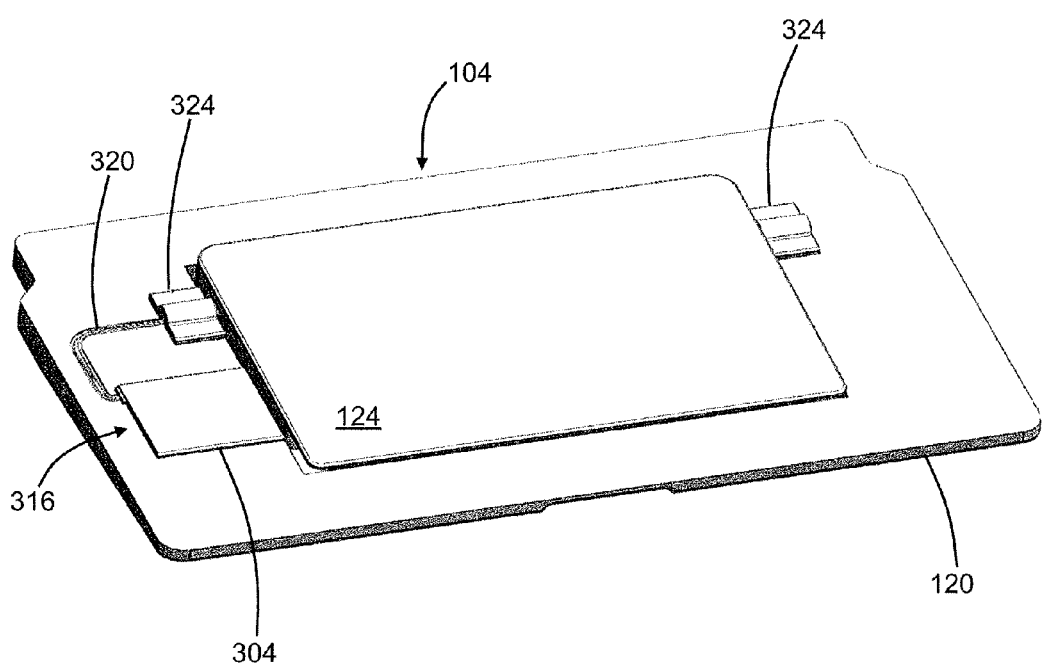
FIG. 3C is a perspective interior layout view an exemplary tray table.

In contrast, the tray table 104 has its own power source in the form of an internal removable battery, as shown in FIGS. 3A-3C. This battery 304 provides power to the electronic device to power and/or recharge the electronic device. Since the battery 304 is part of the tray table 104, there is no need to rewire or wire an aircraft to support the tray table. It is contemplated however that, if desired, the tray table 104 may be connected to aircraft power systems to receive power to its electronic device 108 though this would eliminate some of the weight savings provided by the tray table.

It is also contemplated that the electronic device 108 may be charged in various other ways via the tray table 104. For example, the tray table 104 may charge an electronic device 108 via induction in one or more embodiments. Alternatively or in addition, the tray table 104 (or the electronic device 108) may have one or more solar panels for charging purposes or to power the electronic device. Other power sources may be used as well. For example, devices that generate electricity from temperature differences (e.g., thermoelectric generators) or vibration (e.g., kinetic energy electrical generators) may be used in addition to or instead of a battery 304.

Referring to FIGS. 3A-3B, it can be seen that the battery 304 may have one or more power level indicators 308, such as lights, LCD displays, and the like. These indicators 308 inform flight or maintenance crews of how much power is remaining in the battery 304. When low, the battery 304 can be easily removed for recharging and/or replacement. For example, as FIG. 3B shows, the battery 304 can be ejected or otherwise removed from the tray table 104 quite easily.

This is advantageous in that flight crews can readily view the power level of the battery 304 and change batteries as necessary. For example, during cleaning after an aircraft has landed, any low batteries 304 may be quickly and easily identified and replaced. It is contemplated that the removed batteries 304 may be placed in a charger and recharged for subsequent usage. A charger having multiple slots or receptacles to accept multiple batteries may be used to accomplish recharging. In addition, such charger may be handheld or portable to function as a carrier. In this manner, low batteries 304 can be removed from each seat and placed into the charger. The charger can then be moved to a charging area on (or off) the aircraft to charge the low batteries in bulk.

Typically, a battery 304 will be locked into the tray table 104 to prevent passengers from removing the battery. Thus, in one or more embodiments, a release mechanism 312 may be provided to prevent unauthorized removable while allowing authorized removable of batteries 304 to be quick and easy. The release mechanism 312 may accept one or more keys or other unlocking devices/tools to operate. The battery locking mechanism may be configured to automatically lock a battery in the body 120 of the tray table 104 to speed the battery replacement process.

FIG. 3C provides an internal view of the tray table 104. As can be seen, the top half of the tray table 104 has not been illustrated to show an exemplary internal layout. As can be seen, a compartment 316 may be formed in the body 120 of the tray table 104 to accept the battery 304. This compartment 316 may be externally accessible (e.g., open to the outside) so that the battery 304 can be removed. One or more leads or conductors 320 may provide a conduit for power to travel from the battery 304 to the electronic device. As can be seen, a rotating mount 324, pivot, or hinge of the inner tray 124 may allow the conductors 320 to electrically connect to the electronic device, such as via a port of the inner tray (while securing the inner tray 124 to the tray table 104).

In some embodiments, the battery compartment 316 may be in or attached to the inner tray 124. In such embodiments, the battery 304 may be removable as described above. One or more conductors 320 may connect the battery 304 to the electronic device. In such case, since the battery 304 is supported by the inner tray 124, the conductors 320 need not bend or twist when the inner tray is rotated.

It is contemplated that a switch may be provided in one or more embodiments to automatically connect or disconnect the battery 304 from the electronic device. For instance, when the inner tray 124 is in a closed position (such as in FIG. 1B), the switch may disconnect the battery 304 to prevent battery drain. When the inner tray 124 is in an open position (such as in FIG. 1C) the switch may reconnect the battery 304 to the electronic device. The switch may be a mechanical device that connects and disconnects the battery 304 when the inner tray 124 is moved from a closed position to an open position. Alternatively one or more sensors may determine the position of the inner tray 124 and connect/disconnect the battery 304 appropriately.

Figure 3D:
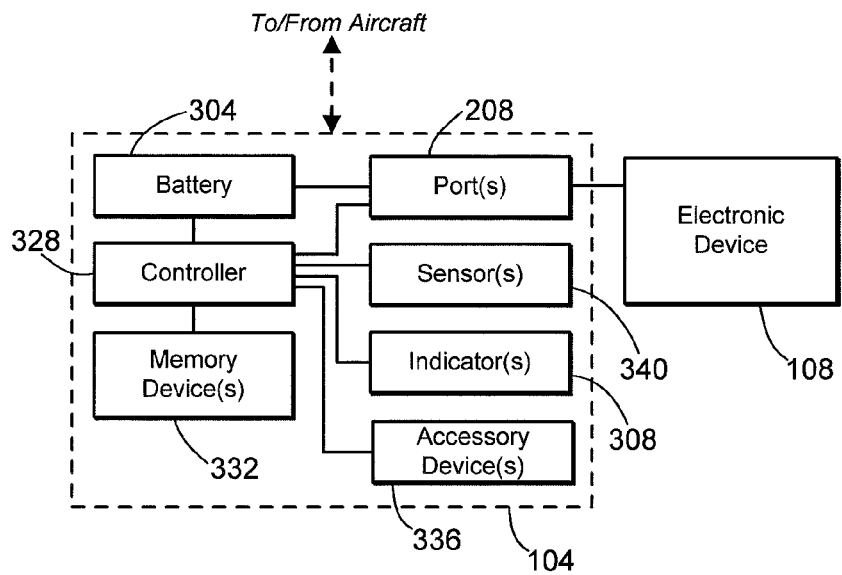
FIG. 3D is a block diagram illustrating an exemplary tray table.

FIG. 3D is a block diagram illustrating the components of an exemplary tray table 104. In general, these components will be held within the body 120 of the tray table. As can be seen, in one or more embodiments, the tray table 104 may comprise a controller 328, which may be configured to control operation of the tray table 104 and its various components to provide the functionality disclosed herein. For example, among other things, the controller 328 may be configured to charge an electronic device 108 via a port 208, detect power levels of the tray table's battery 304, indicate the power level of the battery via an indicator 308, and/or detect the presence or absence of the electronic device within the inner tray via a sensor 340.

The controller 328 may be a microprocessor, integrated circuit, or other circuit. The controller 328 may be hard wired to provide the functionality disclosed herein and/or may execute machine readable code to provide the same. In some embodiments, this machine readable code may be stored on a memory of the controller itself or a separate memory device 332. The memory device 332 may be used to store other information as well, such as configuration settings, various media (such as for IFE or safety presentation purposes), and the like. The memory device 332 may be optional and thus not provided in all embodiments.

As can be seen, the tray table 104 may also include one or more accessory devices 336. For example, a credit card reader, RFID reader, Bluetooth™ transceiver, and/or currency acceptor could be provided such as to allow passengers to make payments for IFE services at the tray table 104. In one embodiment for example, a passenger could swipe a credit card, insert coins, bills or other currency, or pay wirelessly via a RFID or Bluetooth enabled device. It is noted that the Bluetooth transceiver may also or alternatively be used to share data with other devices, such as wireless headsets, smart phones, laptops or the like.

FIG. 3D also illustrates a connection between a tray table 104 and the aircraft. This connection is optional and thus is not provided in all embodiments. When provided, such connection may provide electrical power and/or data to the tray table 104 either by a wired or wireless connection. If wireless power is desired, such power may be provided by induction chargers 344 located at each passenger seat. For example, when the tray table 104 is in close proximity to the passenger seat, such as when stowed, the tray table's battery may be charged by an induction charger 344. Power and/or data from the aircraft can be shared with the electronic device 108 via the tray table's port 208.

Figure 4:
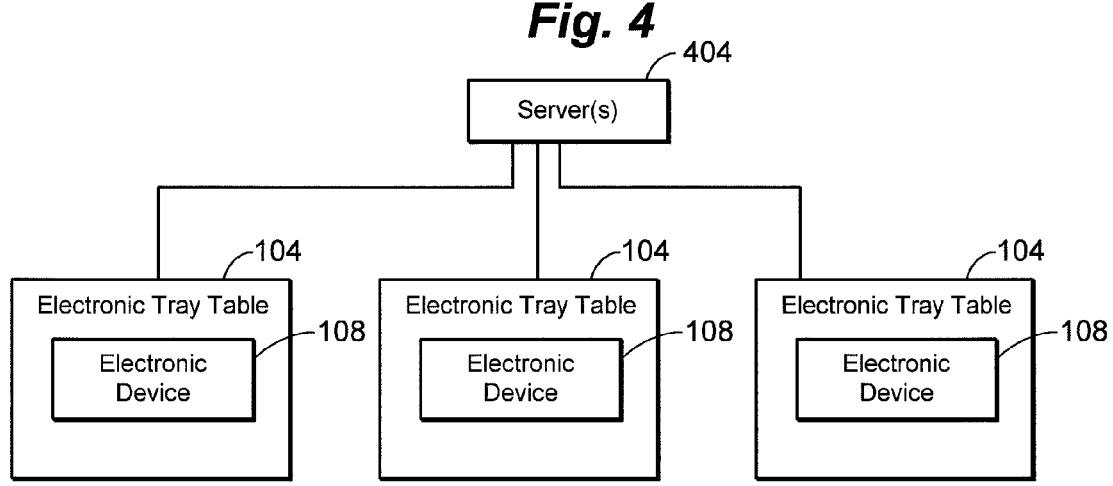
FIG. 4 is a block diagram illustrating an exemplary in-flight entertainment system.

FIG. 4 is a block diagram illustrating an exemplary in-flight entertainment system having tray tables. As can be seen, a server 404 may be provided to supply media and other data to the tray tables 104. The server 404 and electronic devices 108 of the tray tables 104 may communicate data via one or more communication links that will typically be wireless. Books, magazines, advertisements, video, photos, audio, web pages, and other data may be provided by the server 404 in this manner.

In addition, input from passengers collected by the electronic devices 108 may be transmitted to the server 404 as well. This permits interactivity with the server 404. For instance, passengers may order media, such as movies, songs, news or other articles from the server 404 by providing input at the electronic device 108 at their seats. Since the server 404 may be onboard the aircraft, media distribution is efficient because the electronic devices 108 do not need to communicate with a ground based server. It is contemplated that passengers may also or alternatively communicate with flight crews via the electronic devices 108 and/or server 404. The flight crew may have their own electronic device to receive and respond to such communication. For example, text messages, audio, or video could be communicated between passengers and the flight crew via the electronic devices 108 such as to order food or request assistance. This is beneficial because the flight crew need not move up and down the aircraft aisles to communicate with passengers.

In one or more embodiments, the electronic devices 108 may be portable computing devices. An electronic device 108 may have a display 136 such as described above to present information or media visually to a passenger. The display 136 may be an LCD, electronic paper, OLED, or other display technology capable of presenting various still images or video. The display 136 may have a touch sensor to detect user input at the display. In addition or alternatively one or more other inputs such as buttons, switches, knobs, and the like may be provided to capture user input. The electronic device 108 may also have audio inputs and/or outputs to provide a multimedia experience. As stated above, a passenger may utilize headphones to enjoy such an experience It is contemplated that the display 136 may have a one or more protective coverings, such as to prevent it or a portion of it from shattering upon impact. For example, the screen of the display 136 may have a protective film to contain any shards or pieces of the display should it be damaged.

The electronic device 108 may also have one or more communication devices, such as wired or wireless network interfaces. A communication device may be used to communicate media or other data with external devices, such as other electronic devices 108, passenger devices (e.g., smart phones, PDAs, laptops, tablets), the IFE server 404, etc. . . . A communication device may also be a data port, such as a USB port or the like for communicating data with flash drives, human interface devices, and other peripherals.

The electronic device 108 may comprise one or more processors and have its own storage device. The processor may execute instructions such as in the form of machine readable code to provide the media playback and interactive functions of the electronic device described herein. For example, the processor may run an operating system that allows various applications to execute thereon to provide IFE functionality. The machine readable code or instructions may be retrievably stored on the storage device and/or hardwired into the processor itself In one or more embodiments, the electronic device 108 may have particular restrictions programmed therein. For example, certain features may be enabled or disabled at certain times. To illustrate, during boarding, taxiing, takeoff and/or landing only advertising may be displayed by the electronic device 108. Once at a predefined altitude (e.g., 10,000 ft), full functionality of the electronic device 108 may be restored. The enabling or disabling of features may be triggered by an external occurrence. For example, the server 404 (controlled by the flight crew) may instruct an electronic device 108 to enable or disable certain features or to disable itself completely. This allows the flight crew to override passenger input at the electronic devices, such as to present safety presentations and/or advertising.

The tray table or features thereof may be implemented in various ways. For instance, FIGS. 5A-5C illustrate an embodiment having an electronic device 108 at a headrest portion of the passenger seat 128. The inner tray 124 in this embodiment is configured to accept the electronic device 108 and hold the electronic device at the headrest portion of the passenger seat 128. A release 504 may be provided to eject or otherwise release the electronic device 108 from the inner tray 124. The release 504 may be a click-release mechanism to allow passengers to remove the electronic device 108. It is noted that the release 504 may be automatically disabled at certain times, such as during takeoff and landing to prevent unauthorized use or theft.

As can be seen from FIG. 5B, the inner tray 124 may allow the electronic device 108 to pivot to provide a better viewing angle for a passenger. In addition, as shown in FIG. 5C, the inner tray 124 may allow the electronic device 108 to be completely removed for handheld use.

The features described above with regard to the tray table may be provided in a headrest mounted embodiment. For example, the inner tray 124 or the passenger seat 128 itself may house one or more removable batteries to provide power to the electronic device 108. In addition or alternatively, the passenger seat 128 may be wired to the aircraft power system to provide power to the electronic device 108.

In addition, one or more sensors, switches, ports, or the like may be used to detect the presence or absence of the electronic device 108 within the inner tray, such as described above. If the electronic device 108 is not within the docking station 124 at particular times, an alert may be generated. As stated above, this feature is useful in preventing theft and unauthorized use.

It is contemplated that in some embodiments the electronic device 108 need not be stored in an inner tray 124. For instance, the electronic device 108 could be stored in a seat pocket of the passenger seat 128 similar to a magazine or safety pamphlet. In such embodiments, one or more sensors, switches, ports, or the like may be used to determine the presence or absence of the electronic device 108 within the seat pocket to prevent theft or unauthorized use. It is noted that the inner tray 124 could be provided within the seat pocket or replace the seat pocket in some embodiments.

Alternatively or in addition, a charging cable may be provided so that the electronic device 108 may be connected to a battery 304 of the inner tray 124 or at the passenger seat 128. The charging cable could also be used to transfer power from the aircraft's wiring to the electronic device 108 such as in embodiments where power is wired to the passenger seats 128. Once connected to the charging cable, the electronic device 108 may be stored in a seat pocket or inner tray.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A tray table for a passenger seat comprising, in combination:
    a body;
    an inner tray comprising one or more channels at a peripheral portion of the inner tray configured to receive and hold a portable electronic device, the portable electronic device having a display screen, wherein the portable electronic device is secured to the inner tray when one or more of its edges engage the one or more channels and is removable from the inner tray by sliding the one or more edges out of the one or more channels;
    a port within at least one of the one or more channels and configured to connect to the portable electronic device, wherein the port is in electrical communication with the portable electronic device when the portable electronic device is secured to the inner tray, and the port is not in electrical communication with the portable electronic device when the portable is removed from the inner tray;
    an opening in the body configured to accept the inner tray, the inner tray rotatably mounted in the opening and connected to the body via one or more rotatable mounts; and
    one or more mounts configured to movably attach the body to a back portion of the passenger seat, wherein the body is movable between a stowed position and a service position relative to the passenger seat.

2. The tray table for a passenger seat of claim 1 further comprising a sensor configured to detect the presence or absence of the portable electronic device in the inner tray.

3. The tray table for a passenger seat of claim 2 further comprising a communication device, wherein the tray table transmits an alert via the communication device if the sensor detects that the portable electronic device is absent from the inner tray.

4. The tray table for a passenger seat of claim 1 further comprising a rechargeable battery within the body and in electrical communication with the port.

5. The tray table for a passenger seat claim 4, wherein the rechargeable battery is removable from the body.

6. The tray table for a passenger seat claim 1, wherein the inner tray includes a transparent cover to protect the display screen.

7. A tray table assembly for a passenger seat comprising:
    a body having a an opening therein;
    one or more mounts configured to rotatably attach the body to a back portion of the passenger seat, wherein the body is movable between a stowed position and a service position relative to the passenger seat;
    an inner tray rotatably mounted in the opening and connected to the body by one or more rotatable mounts, the inner tray comprising one or more channels at a peripheral portion of the inner tray, wherein the portable electronic device is held by the inner tray when one or more of its edges engage the one or more channels and is removable from the inner tray by sliding the one or more edges out of the one or more channels, wherein the inner tray is rotatable between an open position and a closed position via the one or more mounts when the body is in the service position; and
    a port within at least one of the one or more channels configured to provide electrical power to the portable electronic device.

8. The tray table assembly for a passenger seat of claim 7, wherein a back panel of the inner tray is coplanar with a top surface of the body when the inner tray is in the closed position.

9. The tray table assembly for a passenger seat of claim 7, wherein a display screen of the portable electronic device is visible through one end of the opening in the body when the inner tray is in the closed position.

10. The tray table assembly for a passenger seat of claim 7, wherein the inductive charger port provides power to the portable electronic device when the body is in the stowed position relative to the passenger seat.

11. The tray table assembly for a passenger seat of claim 7, wherein the port is a data port configured to provide data to the portable electronic device.

12. The tray table assembly for a passenger seat of claim 7 further comprising a sensor configured to detect when the portable electronic device is absent from the inner tray.

13. The tray table assembly for a passenger seat of claim 12 further comprising communication device configured to transmit a notification when the sensor detects the portable electronic device is absent from the inner tray.

14. A method for providing in-flight entertainment at a passenger seat with a tray table comprising:
    providing a tray table comprising an opening having a rotatable inner tray secured therein, the rotatable inner tray secured to the tray table via one or more rotatable mounts;
    receiving at least one edge of a portable electronic device with one or more channels at a peripheral portions of the inner tray, the portable electronic device comprising a display screen for providing the in-flight entertainment;
    securing the portable electronic device to the inner tray at its at least one edge with the one or more channels, wherein the portable electronic device is in electrical communication with a port in the one or more channels when held by the inner tray; and
    releasing the portable electronic device from the inner tray by sliding the at least one edge of the portable electronic device out of the one or more channels, wherein the portable electronic device is not in electrical communication with the port when released from the inner tray;
    wherein the tray table is mounted to the passenger seat and movable between a service position and a stowed position relative to the passenger seat and the one or more inductive charges provide power to the portable electronic device when the tray table is in a stowed position.

15. The method of claim 14 further comprising providing a media server configured to provide in-flight entertainment material via electronic communication with the portable electronic device.

16. The method of claim 14 further comprising transmitting a notification from a communication device of the tray table when the portable electronic device is not secured in the inner tray.

17. The method of claim 14 further comprising charging the portable electronic device using a battery within the tray table when the tray table is in the service position.

18. The method of claim 14 further comprising providing data to the portable electronic device via the port in the one or more channels.

\* \* \* \* \*